I. F. TALBOT.
ELECTRIC HEATER.
APPLICATION FILED DEC. 20, 1912.

1,079,895.

Patented Nov. 25, 1913.

2 SHEETS—SHEET 1.

Witnesses
C. E. Kesler
Chas. S. Hyer.

Inventor
Ivan F. Talbot
by James L. Norris,
Atty.

I. F. TALBOT.
ELECTRIC HEATER.
APPLICATION FILED DEC. 20, 1912.

1,079,895.

Patented Nov. 25, 1913.

2 SHEETS—SHEET 2.

Witnesses:
Chas. S. Hyer

Inventor
Ivan F. Talbot
Atty.

UNITED STATES PATENT OFFICE.

IVAN F. TALBOT, OF BOISE, IDAHO, ASSIGNOR TO ERNEST O. ATWOOD, OF BOISE, IDAHO.

ELECTRIC HEATER.

1,079,895.  Specification of Letters Patent.  Patented Nov. 25, 1913.

Application filed December 20, 1912. Serial No. 737,903.

*To all whom it may concern:*

Be it known that I, IVAN F. TALBOT, a citizen of the United States, residing at Boise, in the county of Ada and State of Idaho, have invented new and useful Improvements in Electric Heaters, of which the following is a specification.

This invention relates to an electric heater for general application and has particular reference to an organization from which electrically generated heat is translated or transmitted to a heating means whether liquid or solid for utilization in heating buildings, cooking or other domestic operations, as well as in pursuing mechanical functions or work where a heated surface or heating means is required.

The primary object of the invention is to materially economize in the use of electric current for heating purposes without in the least modifying the desired resultant operation, and to increase the capacity and efficiency of various forms of electrical heating devices by eliminating the usual obstructive factor of an interposed air space between the main heat transmitting means or element and the liquid or solid means adapted to be heated.

Generally speaking, the invention consists of a heating element in electrical connection with a transformer or other electrically controlled device incased or inclosed within a heat transmitting medium of any suitable material, such as cement, and means adjacent to or in contact with the said transmitting medium adapted to receive the heat generated for use in heating compartments or buildings, domestic purposes and mechanical arts or for any other application where heat may be desired.

The invention further consists in the construction and arrangement of the several parts which will be more fully hereinafter described and claimed.

Figure 1:
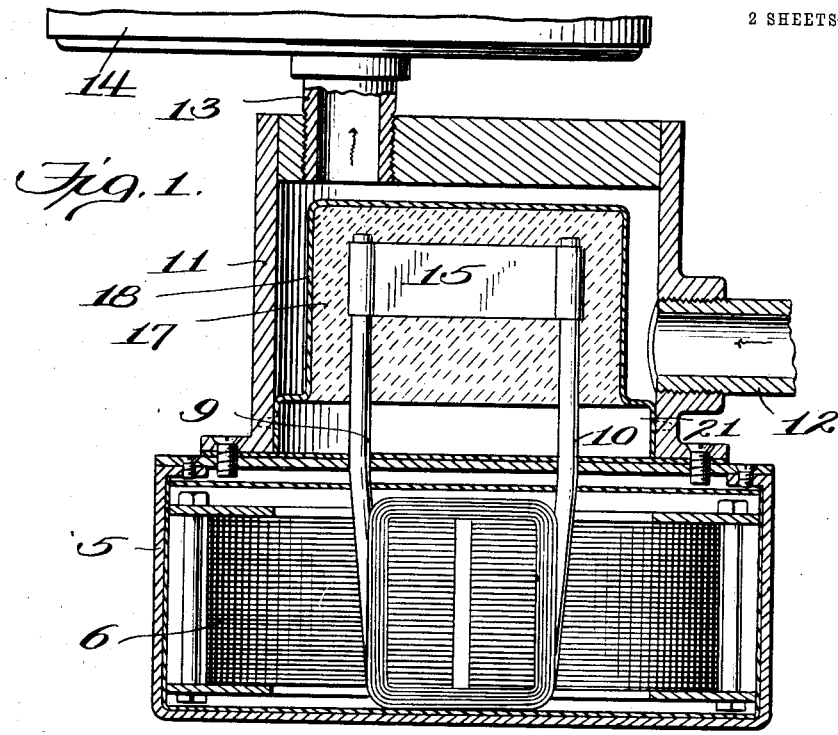
Figure 2:
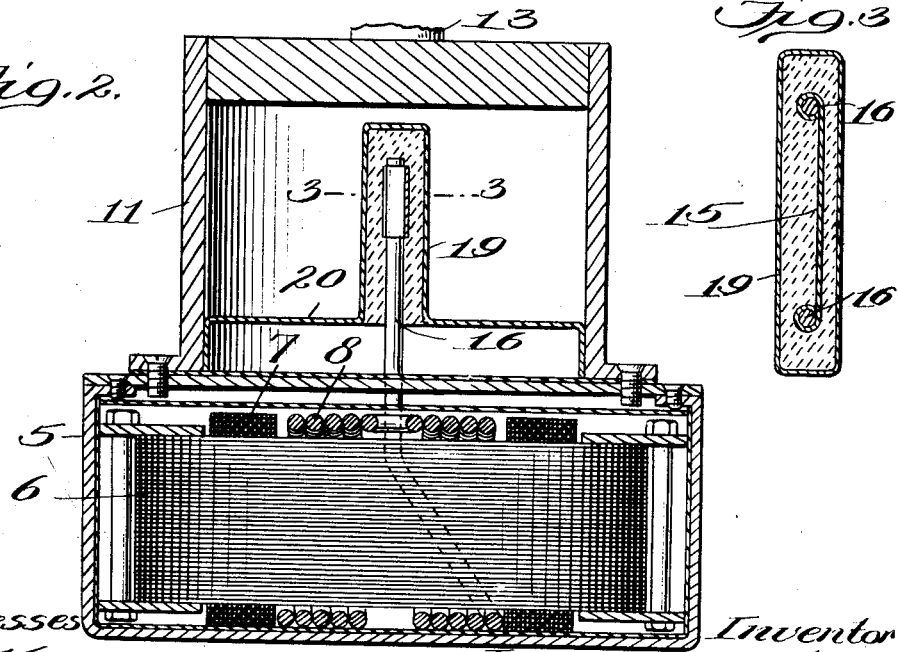
Figure 3:
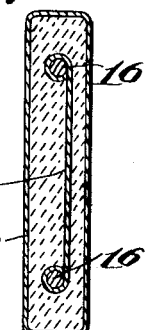
Figure 5:
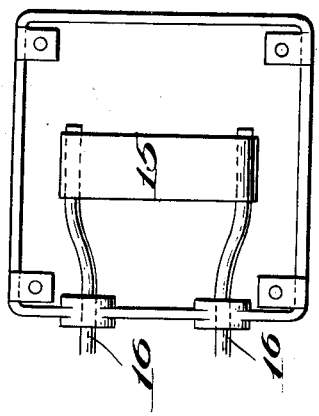
Figure 5:
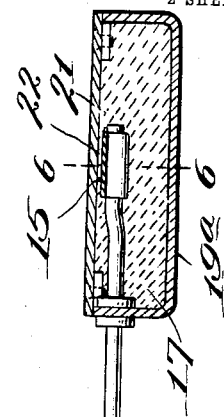
Figure 5:
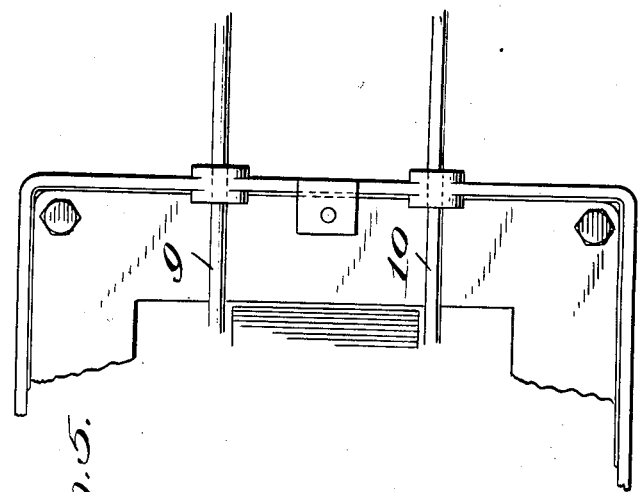
Figure 6:
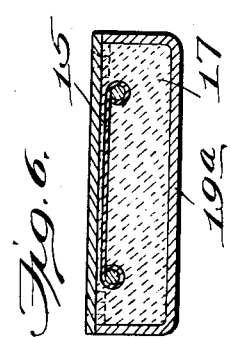
Figure 4:
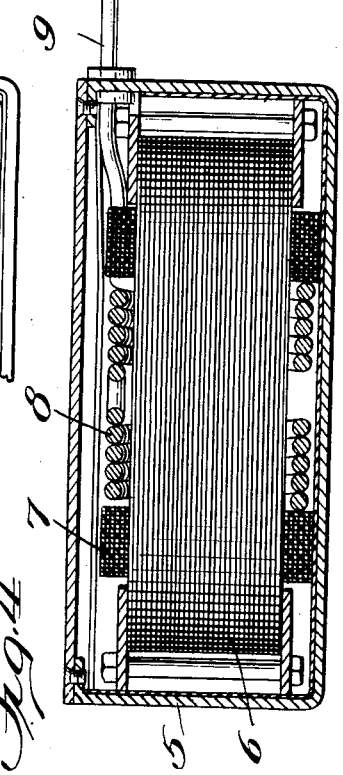

In the drawings: Figure 1 is a longitudinal section showing a transformer, a water circulating chamber and a water tank or boiler connected to said chamber together with the heating organization embodying the features of the invention. Fig. 2 is a transverse vertical section through the device shown by Fig. 1. Fig. 3 is a horizontal section taken in the plane of the line 3—3, Fig. 2. Fig. 4 is a longitudinal section, partially broken through, showing the application of the invention to a heating or cooking disk. Fig. 5 illustrates a plan view of portions of the apparatus shown by Fig. 4. Fig. 6 is a transverse vertical section on the line 6—6, Fig. 4.

The apparatus embodying the features of the invention may be mounted in a single casing structure, as shown by Figs. 1 and 2, or may be embodied in separate casing means, as shown by Figs. 4 and 5, the modification of the inclosing casing being dependent solely upon the particular application of the features of the invention.

Referring to Figs. 1, 2 and 3, the numeral 5 designates a suitable inclosing casing having a transformer 6 mounted therein and embodying as usual primary and secondary coils 7 and 8. This transformer may be of any approved type or may be replaced by any other suitable electrical device for converting a current of high voltage and small amperage into a current of high amperage and small voltage. As will be readily understood, the primary coil 7 of the transformer may be suitably connected to a line wire or feeder for a high voltage current, and through the medium of conducting arms 9 and 10 the transformed current having a high amperage and low voltage is transmitted from the secondary coil 8 through the top of the casing 5. On the top of the casing 5 a water chamber 11 is mounted and has a bottom inlet pipe 12 and an upper outlet pipe 13 which communicate with a boiler or tank 14, or any other arrangement may be adopted whereby water of low temperature is fed into the lower portion of the chamber 11 and the heated water is permitted to pass out or flow from the top portion of said chamber. It is obvious that the pipe 13 might be connected to a coil or a hot water conveying pipe as the invention is not limited in any sense to the use of a specific water receiving or conveying means.

Within the chamber 11 the heating organization embodying the features of the invention is disposed and comprises essentially a heating element 15 having arms 16 suitably connected to the arms 9 and 10 of the secondary coil 8, the said heating element 15 and a portion of the arms 16 thereof being embedded or inclosed in a heat transmitting means 17 which may consist of cement or other suitable material. As a specific structure of convenience a metallic casing or inclosure 18 is provided and comprises an upright hollow member 19 of reduced cross-sectional extent and a supporting plate 20 from which said member rises. The heating element 15 with its arms 16 is inserted in the member 19 and the heating medium 17 is poured into said hollow member flush with the one side of the plate 20, as shown, to thereby hold the said heating element 15 and its arms in fixed position within the member 19 and also exclude the air entirely from the element 15. The plate 20 carrying the member 19 and the element 15 with its arms 16 is then inserted in the chamber 11 and secured in fixed position as shown, so that the water in said chamber may readily circulate around and over the plate 20 and member 19 and become thoroughly heated. The plate 20, it will be seen, forms the bottom for the chamber 11 and is held by a collar or band 21 in proper position in the said chamber. As shown, the element 15 consists of a flat plate which may be formed from a suitable high resistance metal, such as German silver or other metal adapted for the purpose, or an alloy of metals as may be desired and found best adapted for the purpose. The object in embedding the element 15 in the transmitting means 17 is to exclude the air from the said element, as hereinbefore noted, to prevent deterioration of the said element and also to effectively increase the heating area of the element 15 by associating therewith the means 17 having a greater extent, both in length and width, than the said element and thereby minimizing the proportions of the element 15 to obtain a maximum of efficiency and at the same time advantageously increasing the heating area of the said element through the heating medium or means 17 with the result that the heat will be distributed more evenly and effectively over the different portions of the member 19 and also throughout the plate 20 and thus more quickly and positively heat the water flowing into the chamber 11. Precisely the same heating organization is included in the apparatus as shown by Figs. 4, 5 and 6, the casing 5, transformer 6 with its coils 7 and 8 and conductors 9 and 10 being precisely the same as in the apparatus shown by Figs. 1, 2 and 3 with the exception that the conductors 9 and 10 or the conducting arms of the transformer project outwardly in a substantially horizontal plane from the casing 5 instead of being disposed vertically as shown by Figs. 1 and 2.

In the apparatus shown by Figs. 4, 5 and 6 the conductors or arms 9 and 10 are connected to arms 16 of a heating element 15 inclosed or embedded in a heat transmitting medium 17 held in a hollow member 19$^a$ having one side 21 arranged to serve as a cooking disk, the heating terminal or element 15 being located close to the under side of said cooking disk or separated from the latter only by a thin film of the heating medium 17 as at 22.

All of the parts of the apparatus as shown by Figs. 4 and 5 are practically the same as the corresponding parts in Figs. 1 and 2, the water chamber 11 being omitted in Figs. 4, 5 and 6 as well as the accessories to said water chamber, and as hereinbefore indicated the same structural principle is embodied in Figs. 4, 5 and 6 as in Figs. 1, 2 and 3, and it will be understood that the arms 9 and 10 as well as the arms 16, heating element 15 and hollow member or inclosure 19$^a$ having the heating medium therein enveloping the heating element 15 may be disposed at any angle relatively to each other.

The same organization of heating elements or the element 15 with its arms 16 and the inclosing heating medium 17 may be incorporated in a number of devices, such as electric irons for pressing purposes, curling irons, and other devices where electricity is used as a heating means without in the least modifying the essential features of the invention.

In the various applications of the invention it will be understood that changes in the proportions, dimensions and minor details may be adopted at will.

What is claimed is:

1. In an electrical heater, a heating element consisting of a single flat strip of metal, an electrical device having arms connected to the opposite extremities of said flat strip, a heat transmitting cementitious substance directly applied over and having the strip and portions of the arms embedded therein, and an inclosing device adjacent to said strip and operating to hold the said substance, the arms projecting exteriorly of the inclosing device and supporting the latter, strip and substance.

2. In an electrical heater, a heating element consisting of a single flat strip of metal, an electrical device having arms connected to the opposite ends of said strip, a heat transmitting cementitious substance directly applied over and having the strip and portions of the arms embedded therein, and an inclosing device for said strip and substance and having a comparatively narrow cross-sectional extent to reduce the thickness of the substance between the strip and at least one side of the inclosing device to increase the heat on one side of the device.

In testimony whereof I have hereunto set my hand in presence of two subscribing witnesses.

IVAN F. TALBOT.

Witnesses:
CHAS. S. HYER,
JAMES L. NORRIS.